(12) United States Patent
Yuen et al.

(10) Patent No.: US 11,674,800 B2
(45) Date of Patent: Jun. 13, 2023

(54) LASER LEVEL METER AND USE METHOD THEREFOR

(71) Applicant: Robert Bosch GmbH, Stuttgart (DE)

(72) Inventors: Eric Yuen, Tuen Mun (HK); Eddie Kwan, Lam Tin (HK); Wah Pong Calvin Chan, Kennedy Town (HK)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/603,547

(22) PCT Filed: Apr. 23, 2019

(86) PCT No.: PCT/CN2019/083868
§ 371 (c)(1),
(2) Date: Oct. 13, 2021

(87) PCT Pub. No.: WO2020/215202
PCT Pub. Date: Oct. 29, 2020

(65) Prior Publication Data
US 2022/0187070 A1  Jun. 16, 2022

(51) Int. Cl.
*G01C 15/00* (2006.01)

(52) U.S. Cl.
CPC ......... *G01C 15/004* (2013.01); *G01C 15/008* (2013.01)

(58) Field of Classification Search
None
See application file for complete search history.

(56) References Cited

U.S. PATENT DOCUMENTS 5,367,779 A * 11/1994 Lee ............... G01C 15/004
33/290
5,539,990 A * 7/1996 Le ................. G01C 15/004
356/138
(Continued)

FOREIGN PATENT DOCUMENTS

CN  2872305 Y  2/2007
CN  201392196 Y  1/2010
(Continued)

OTHER PUBLICATIONS

International Search Report corresponding to PCT Application No. PCT/CN2019/083868, dated Jan. 31, 2020 (German and English language document) (7 pages).

*Primary Examiner* — Christopher W Fulton
(74) *Attorney, Agent, or Firm* — Maginot, Moore & Beck LLP

(57) ABSTRACT

A laser level includes a level body, the level body including a body housing and a laser light source contained in the body housing, the laser light source configured to emit a laser light beam plane so as to project a laser light line on a target surface, the laser light beam plane configured to form an adjustable angle relative to a horizontal plane, and the laser level including a fixing structure configured to fix the laser light source such that the laser light beam plane projected therefrom is fixed at an adjusted angle, the laser light line providing a levelling height when in a horizontal state. The laser level further includes an adjustment means configured to adjust the attitude of the laser light source when the laser light line projected onto the target surface from the laser light source from a non-horizontal state to a horizontal state.

20 Claims, 1 Drawing Sheet

(56) References Cited

U.S. PATENT DOCUMENTS

| | | | | |
|---|---|---|---|---|
| 5,983,510 A * | 11/1999 | Wu | ............... | G01C 15/004 |
| | | | | 33/DIG. 1 |
| 6,796,040 B2 * | 9/2004 | Ohtomo | ............ | H01S 5/02212 |
| | | | | 362/268 |
| 6,938,350 B1 * | 9/2005 | Hersey | ............... | G01C 15/004 |
| | | | | 33/286 |
| 6,941,665 B1 * | 9/2005 | Budrow | ............... | G01C 15/008 |
| | | | | 33/286 |
| 7,065,890 B1 * | 6/2006 | Chang | ............... | G01C 15/004 |
| | | | | 33/286 |
| 7,685,725 B2 * | 3/2010 | Rodriguez | ......... | H01Q 1/1207 |
| | | | | 33/290 |
| 9,523,575 B2 * | 12/2016 | Kumagai | ............ | G01C 15/004 |
| 11,125,557 B1 * | 9/2021 | Riley | ............... | G01C 15/008 |
| 2004/0221462 A1 * | 11/2004 | Liao | ............... | G01C 15/008 |
| | | | | 33/286 |
| 2010/0073759 A1 * | 3/2010 | Kodaira | ............ | G01C 15/004 |
| | | | | 359/298 |
| 2021/0231436 A1 * | 7/2021 | Eun | ............... | G01C 15/004 |

FOREIGN PATENT DOCUMENTS

| | | | | |
|---|---|---|---|---|
| CN | 203704931 U | 7/2014 | | |
| CN | 104515511 A | 4/2015 | | |
| CN | 105674966 A | 6/2016 | | |
| CN | 107907119 A | 4/2018 | | |
| JP | S60-67812 A | 4/1985 | | |
| WO | WO-2015096060 A1 * | 7/2015 | ......... | G01C 15/004 |
| WO | WO-2021121895 A1 * | 6/2021 | ......... | G01C 15/004 |

* cited by examiner

FIG. 1
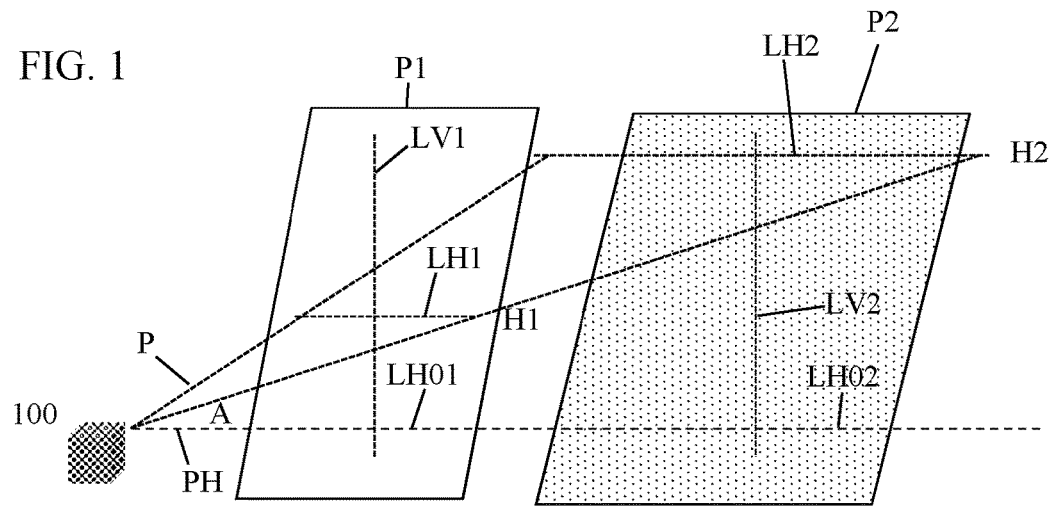
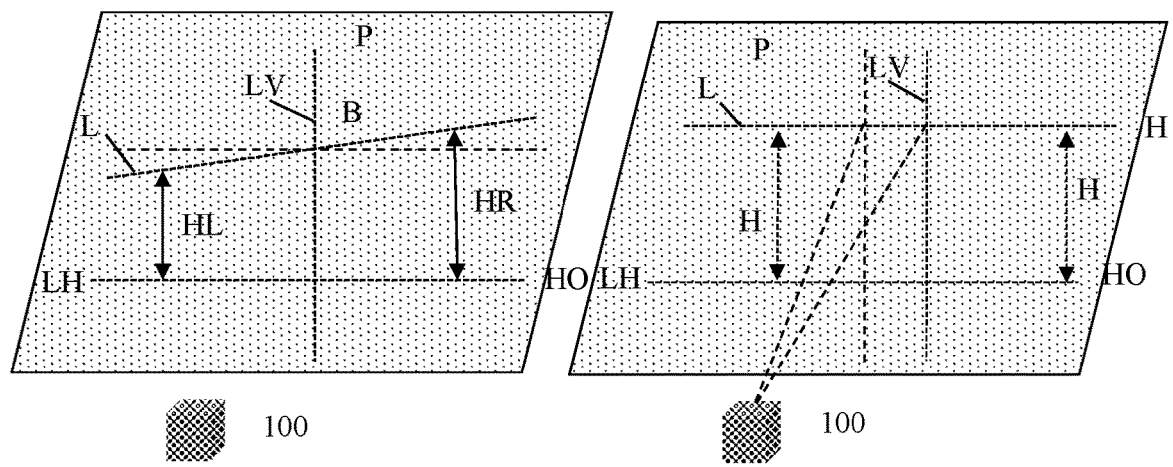
FIG. 2A    FIG. 2B

LASER LEVEL METER AND USE METHOD THEREFOR

This application is a 35 U.S.C. § 371 National Stage Application of PCT/CN2019/083868, filed on Apr. 23, 2019, the disclosure of which is incorporated herein by reference in its entirety.

The present application relates to an improved laser level and a method for using same.

BACKGROUND

A common laser level mainly comprises a level housing containing a laser light source, and an adjustable base on which the level housing is mounted. The laser light source is arranged on a pendulum bob component that is pivotably mounted in the level housing, and is able to swing back and forth together with the pendulum bob component relative to the level housing. The laser light source generally comprises a lens, so that a laser light beam emitted thereby becomes a planar light beam that is projected onto a target surface, to generate a perfect horizontal laser light line and a perfect vertical laser light line on the target surface, so as to achieve automatic levelling.

However, with such a structure, regardless of the distance between the laser level itself and the target projection surface, and regardless of the orientation of the laser level itself relative to the target projection surface, the horizontal laser light line formed by emission from the laser level and projection onto the target projection surface always remains at the same horizontal height. This height depends on the laser level structure itself, and is specifically the height of the laser light source.

The height of this horizontal laser light line can be adjusted or altered by adjusting the adjustable base of the laser level, in particular a tripod of the adjustable base; however, this adjustment can only adjust the height of the horizontal laser light line by a small amount, within a small range or to a limited extent. The maximum height of the horizontal laser light line of a laser level with such a structure can reach about 1.5 metres.

A telescopic rod can also be used to adjust the height of this horizontal laser light line; when adjustment is performed in this way, the maximum height of the horizontal laser light line can reach about 3.5 metres.

However, in actual operations, it is hoped that a laser level be able to provide a levelling height range of 1-6 metres.

SUMMARY

An object of the present application is to solve the abovementioned technical problem by providing an improved laser level structure, which offers an increased levelling height range, thus enabling the levelling height of the laser level to reach 6 metres or more.

To this end, in one aspect of the present application, a laser level is provided, comprising a level body, the level body comprising a body housing and a laser light source contained in the body housing, the laser light source emitting a laser light beam plane so as to project a laser light line on a target surface, the laser light beam plane being able to form an angle relative to a horizontal plane, the angle being adjustable, and the laser level comprising a fixing structure for fixing the laser light source such that the laser light beam plane projected therefrom is fixed at an adjusted angle, the laser light line providing a levelling height when in a horizontal state or when changed to a horizontal state by using an adjustment means to adjust the attitude of the laser light source; the laser level further comprising the adjustment means, which is configured to adjust the attitude of the laser light source when the laser light line projected onto the target surface from the laser light source is in a non-horizontal state, so that the laser light line changes to a horizontal state.

In one embodiment, the laser level comprises a means for providing a reference standard for judging whether the laser light line is in a horizontal state. For example, said means is a sensor. For example, the laser light source is an additional laser light source and the laser light line is an additional laser light line, said means is a reference laser light source which emits a reference laser light beam plane so as to project a reference laser light line on the target surface, the reference laser light beam plane being a horizontal laser light beam plane and/or a vertical laser light beam plane, and the reference laser light line being a horizontal laser light line and/or a vertical laser light line; a non-horizontal state and horizontal state of the additional laser light line being determined with reference to the horizontal laser light line and/or vertical laser light line.

In another aspect, a laser level is provided, comprising a level body, the level body comprising a body housing and further comprising a reference laser light source and an additional laser light source which are contained in the body housing, wherein the reference laser light source emits a reference laser light beam plane so as to project a reference laser light line on a target surface, the reference laser light beam plane being a horizontal laser light beam plane and/or a vertical laser light beam plane, and the reference laser light line being a horizontal laser light line and/or a vertical laser light line, and wherein the additional laser light source emits an additional laser light beam plane and projects an additional laser light line on the target surface, the additional laser light line providing a levelling height when in a horizontal state or when changed to a horizontal state by using an adjustment means to adjust the attitude of the additional laser light source;

the laser level further comprising the adjustment means, which is configured to adjust the attitude of the additional laser light source when the additional laser light line projected onto the target surface from the additional laser light source is in a non-horizontal state, so that the additional laser light line changes to a horizontal state.

In a third aspect, a method for using the laser level comprises: activating the reference laser light source and additional laser light source of the laser level; and using the adjustment means of the laser level to adjust the attitude of the additional laser light source so that the additional laser light line (L) projected onto the target surface from the additional laser light source is put into a horizontal state. The method may further comprise: moving the laser level so as to change the distance between the laser level and the target surface.

In the laser level according to the present application, by providing the additional laser light source and the adjustment means capable of adjusting the attitude of the additional laser light source to ensure that the additional laser light line projected onto the target surface by the additional laser light source is in a horizontal state, and by configuring the additional laser light line so that the additional laser light line in a horizontal state is located above a self-levelling height provided by the reference laser light source, a levelling height higher than the self-levelling height determined by the reference laser light source is provided.

Due to the fact that there is an angle between the additional laser light beam plane and the horizontal laser light beam plane, by changing the distance between the laser level and the target surface it is possible to obtain a set of levelling heights higher than the self-levelling height, said set of levelling heights being referred to as an additional levelling height range herein. In this way, the levelling height range that the laser level is capable of realizing is increased, and the application scope and practicality of the laser level are increased or expanded.

In one embodiment, the adjustment means is configured as a rotatable pedestal of the laser level; the rotatable pedestal can be part of a base assembly supporting the level body. By rotating the rotatable pedestal in a horizontal plane, the attitude of the additional laser light source can be changed, to achieve the objective of adjusting a non-horizontal additional laser light line to a horizontal state. In this way, the levelling height range of the laser level is expanded to the maximum extent with minimal change to the structure of the laser level, so the structure is simple as well as being economical and effective.

The rotation of the rotatable pedestal can be controlled manually or electrically. By rotating the rotatable pedestal in specific angular increments, the attitude of the additional laser light source can be precisely adjusted progressively.

A specific application program of a widely used smart phone can be used as a control unit of the laser level to control the rotation of the rotatable pedestal, making the adjustment process simple, convenient and quick.

The control unit is configured to obtain an angle between the additional laser light line and the vertical laser light line, or obtain distances in the vertical direction between the additional laser light line and the horizontal laser light line at two positions on the left and right sides of the vertical laser light line respectively; judge whether the additional laser light line is in a horizontal state on this basis; and when it is not in a horizontal state, determine a direction and amount of rotation of the rotatable pedestal required to change the additional laser light line to the horizontal state, and actuate the rotatable pedestal to rotate.

By adjusting an adjustable supporting leg of the base assembly, the laser level according to the present application can use the horizontal laser light line projected onto the target surface from the reference laser light source to provide the self-levelling height range; and by changing the distance between the laser level and the target surface, the laser level according to the present application can also use the additional laser light line projected onto the target surface by the additional laser light source to provide a levelling height in the additional levelling height range that exceeds the self-levelling height range.

BRIEF DESCRIPTION OF THE DRAWINGS

A better understanding of the abovementioned and other features and advantages of the present disclosure will be gained in particular embodiments described with reference to the drawings. It should be understood that the drawings are merely intended for illustrative purposes, without limiting the scope of the present disclosure, wherein:

The schematic diagram in FIG. 1 shows a scenario in which an additional laser light line projected onto a target surface from an additional laser light source of a laser level according to the principles of the present application is parallel to a horizontal laser light line projected onto the target surface from a reference laser light source thereof.

The schematic diagram in FIG. 2A shows a scenario in which an additional laser light line projected onto a target surface from an additional laser light source of a laser level according to the principles of the present application is not parallel to a horizontal laser light line projected onto the target surface from a reference laser light source thereof; and The schematic diagram in FIG. 2B shows the additional laser light line in FIG. 2A, after being changed to a horizontal state in which it is parallel to the horizontal laser light line.

DETAILED DESCRIPTION

The laser level according to the present application generally comprises a level body, and a base assembly on which the level body is mounted and supported. The level body comprises a body housing, and a laser light source contained in the body housing. The base assembly mainly comprises a base directly supporting the level body, and an adjustable supporting leg. In general, the base assembly has three supporting legs, at least one of which is configured to be adjustable, so as to provide limited height adjustment for the base and thus for the level body supported by the base. For example, the adjustable supporting leg may be an adjustable tripod. Optionally, the base assembly may comprise any other number of supporting legs, one or more of which, up to all of the supporting legs, may be configured to be adjustable.

The laser level according to the present application may comprise a reference laser light source and an additional laser light source, which are configured to provide a self-levelling height range and an additional levelling height range respectively, wherein levelling heights in the additional levelling height range are higher than levelling heights in the self-levelling height range. That is to say, the laser level according to the present application can utilize the reference laser light source thereof to provide levelling heights in the conventional self-levelling height range, and can also utilize the additional laser light source thereof to provide levelling heights in the additional levelling height range, thus expanding the levelling height range that the laser level is able to provide, because usability is maximized.

The reference laser light source is any known laser light source in the art. The reference laser light source is arranged on a pendulum bob component, which is mounted in the body housing and pivotable relative to the body housing, and the reference laser light source is thus able to swing back and forth with the pendulum bob component relative to the body housing. The reference laser light source may comprise a collimator, such that a laser light beam emitted from the reference laser light source is collimated to a perfect horizontal laser light beam plane and/or vertical laser light beam plane before being projected from the laser level. In an embodiment of this text that is shown in the figures, the reference laser light source projects both a horizontal laser light line and a vertical laser light line on a target surface, and these are also called a horizontal reference line and a vertical reference line for the additional laser light source. In this text, the target surface may be a vertical flat surface.

As stated above, the self-levelling height range of the laser level is realized by means of the reference laser light source thereof. The size of the self-levelling height range that the reference laser light source is able to realize is determined by the amount of adjustment that the adjustable supporting leg of the base assembly is able to provide. In the course of actual levelling operations, if an expected levelling height falls within this self-levelling height range, then the horizontal laser light line and/or vertical laser light line projected from the reference laser light source onto the target surface can be used for levelling; optionally, it might be necessary as required to adjust the adjustable supporting leg of the base assembly in order to obtain the expected levelling height. If the height where levelling is required exceeds this self-levelling height range, then the additional laser light source of the laser level will need to be used for levelling.

Referring to FIG. 1, the horizontal laser light beam plane and vertical laser light beam plane emitted from the reference laser light source of the laser level 100 project a horizontal laser light line and a vertical laser light line perpendicularly to the target surface. FIG. 1 shows a first target surface P1 and a second target surface P2 at different distances from the laser level 100, and horizontal laser light lines LH01 and LH02 and vertical laser light lines LV1 and LV2 projected onto the two target surfaces P1 and P2 by the reference laser light source. As can be seen from FIG. 1, due to the fact that the horizontal laser light beam plane PH and the vertical laser light beam plane emitted from the reference laser light source are projected onto the target surfaces P1 and P2 perpendicularly, the length of the distance between the target surface and the laser level 100 has no effect on the self-levelling height H0 realized by the reference laser light source of the laser level 100.

The additional laser light source of the laser level 100 is configured to project an additional laser light beam plane P from the laser level 100; the additional laser light beam plane P extends upward at an angle A relative to the horizontal laser light beam plane PH emitted by the reference laser light source, and therefore, additional laser light lines LH1 and LH2 produced on the same target surfaces P1 and P2 are located above the horizontal laser light lines LH01 and LH02. Likewise, optionally, the additional laser light source may also comprise a collimator, to ensure that a laser light beam emitted therefrom is collimated to the additional laser light beam plane P before being projected from the laser level 100.

FIG. 1 shows the case where the additional laser light beam plane P is perpendicular to the vertical laser light beam plane emitted from the reference laser light source, and the additional laser light lines LH1 and LH2 produced on the target surfaces P1 and P2 are thus precisely parallel to the horizontal laser light lines LH01 and LH02. Due to the fact that the additional laser light lines LH1 and LH2 are precisely in a horizontal state, they can be used directly for levelling at the heights H1 and H2 thereof.

As can be seen very clearly from FIG. 1, due to the existence of angle A, different levelling heights H1 and H2 can be obtained by adjusting the distances from the laser level 100 to the target surfaces P1 and P2, i.e. by moving the laser level 100 towards or away from the target surfaces, and it is thus possible to achieve a larger levelling height range that is higher than the self-levelling height H0 of a conventional laser level.

FIG. 2A shows the case where an additional laser light line L projected onto a target surface P from the additional laser light source is a non-horizontal laser light line, which is not perpendicular to a vertical laser light line LV projected onto the target surface from the reference laser light source. Since this additional laser light line L is not horizontal, it cannot be used directly for levelling operations. To adapt to such a situation, the laser level according to the present application is provided with an adjustment means, which is configured to adjust the additional laser light source so that the additional laser light line L projected therefrom onto the target surface is changed to a horizontal state perpendicular to the vertical laser light line LV.

According to an embodiment of the present application, the laser level comprises a rotatable pedestal configured as an embodiment of the adjustment means; the rotatable pedestal may be provided as a part of the base assembly of the laser level, for example may be a rotatable component of the base assembly. The rotatable pedestal is attached to the base and is linked to the additional laser light source contained in the body housing. The rotatable pedestal is configured to be rotatable clockwise or anticlockwise in a horizontal plane, and to cause the attitude of the additional laser light source to change when the rotatable pedestal rotates in the horizontal plane, for example to rotate or be deflected in a horizontal plane together with the rotatable pedestal; the deflection of the additional laser light source causes the laser light beam plane emitted therefrom to move, and the additional laser light line L at the intersection of the laser light beam plane and the target surface P changes, for example rotates, until the additional laser light line L is perpendicular to the vertical laser light line LV, and the additional laser light line L is then in a horizontal state, as shown in FIG. 2B. Once the additional laser light line L projected from the additional laser light source has been changed to a horizontal state by rotating the rotatable pedestal in the horizontal plane, the additional laser light line L in a horizontal state can be used for levelling operations. Likewise, as described above in relation to FIG. 1, the height H of the additional laser light line L can be further adjusted or changed by adjusting the distance between the laser level and the target surface, until the desired levelling height position is achieved.

Preferably, in order to finely adjust the attitude of the additional laser light source so as to change the additional laser light line L to a horizontal state, the adjustment of the rotatable pedestal can be performed in specific angular increments, e.g. 0.1 milliradians.

According to the present application, the adjustment of the rotatable pedestal can be performed manually by a user, or automatically performed by wired or wireless remote control. According to the present application, wireless remote control can be achieved using a smart phone or a remote controller.

According to the present application, the laser level may comprise a control unit for realizing an automatic adjustment function; for example, the control unit may be a specific application program of a widely used smart phone or remote controller. The control unit may be configured to: judge whether the additional laser light line L is in a horizontal state, and when it is in a non-horizontal state, determine a direction and amount of rotation of the rotatable pedestal required to change the additional laser light line to a horizontal state, and actuate the rotatable pedestal to begin rotating.

In this embodiment, the step of judging whether the additional laser light line L is in a horizontal state may comprise: using a camera of a smart phone to obtain an image of the target surface P that includes the additional laser light line L, a horizontal laser light line LH and a vertical laser light line LV; obtaining an angle B between the additional laser light line L and the vertical laser light line LV, judging that the additional laser light line L is in a non-horizontal state when the angle B is not equal to 90 degrees, and judging that the additional laser light line L is in a horizontal state when the angle B is equal to 90 degrees; alternatively, obtaining distances HL and HR between the additional laser light line L and the horizontal laser light line at two positions on two opposite sides of the vertical laser light line LV respectively, judging that the additional laser light line L is in a non-horizontal state when the two distances HL and HR are not equal, and judging that the additional laser light line L is in a horizontal state when the distances HL and HR are equal.

The step of determining a direction and amount of rotation of the rotatable pedestal required to change the additional laser light line L to a horizontal state comprises: based on the obtained angle B or distances HL and HR, using a relevant algorithm pre-stored in the control unit to determine a direction of rotation of the rotatable pedestal and calculate the amount that the rotatable pedestal needs to rotate.

In an additional or alternative solution, the control unit may also be configured to: judge whether the additional laser light line L is in a horizontal state, and when it is in a non-horizontal state, actuate the rotatable pedestal to begin rotating; in the process of the rotation of the rotatable pedestal causing the attitude of the additional laser light source to change, repeatedly measuring and monitoring in real time whether the state of the additional laser light line L has already changed to a horizontal state, and stopping the rotation of the rotatable pedestal when the additional laser light line L reaches a horizontal state.

As stated above, in this wireless remote control method, a specific application program of a smart phone or another remote controller can be used as the control unit of the laser level, so operation is simple, economical and effective, with good practicality. Correspondingly, the laser level may be provided with a signal receiving module for receiving an external control signal, a signal processing module for processing the external control signal to form an internal control signal, and a signal execution module for applying the internal control signal to the rotatable pedestal so that it rotates in the horizontal plane and drives the additional laser light source to rotate therewith.

The external control signal may be a Bluetooth signal or a WIFI signal or a SIM card communication signal, for example may be a Bluetooth signal from a Bluetooth device which may for example be a smart phone or a remote controller. The internal control signal may be an infrared signal, and correspondingly, the signal execution module may be an infrared transmitter. The external control signal and internal control signal may comprise the same control information for subjecting the rotatable pedestal to rotational adjustment, but may be configured to follow different wireless communication protocols. Optionally, the external control signal and internal control signal may also contain additional information, for example information for causing the rotatable pedestal to rotate at a faster or slower speed, or rotate in the horizontal plane in a clockwise or anticlockwise direction, or rotate according to a specific rule.

According to the present application, the signal receiving module, signal processing module and signal execution module may be independent modules, or may be configured as an integrated module. In one example, the signal receiving module may be arranged on the body housing of the level body of the laser level, and optionally, it may also be integrated in the signal processing module.

Those skilled in the art should understand that as an alternative embodiment to the smart phone and remote controller mentioned above, any form of wired controller or other wireless controller can be used as the control unit of the laser level.

A method for using the laser level according the present application comprises activating the reference laser light source and additional laser light source of the laser level; if the expected levelling height is within the self-levelling height range, using the horizontal laser light line projected on the target surface by the reference laser light source to perform levelling, wherein the adjustable supporting leg of the base assembly of the laser level can be suitably adjusted as required; and if the expected levelling height exceeds the self-levelling height range, using the laser light line projected on the target surface by the additional laser light source to perform levelling. If the laser light line projected on the target surface by the additional laser light source is not perpendicular to the vertical laser light line projected by the reference laser light source or is not parallel to the horizontal laser light line of the reference laser light source, rotation of the rotatable pedestal is controlled either manually or by means of the control unit automatically or electrically, thereby changing the attitude of the additional laser light source so as to change the additional laser light line to a horizontal state.

The principles of the present application have been described above with reference to a reference laser light source capable of producing both a horizontal laser light line and a vertical laser light line. However, those skilled in the art will understand that the reference laser light source of the laser level might only produce a horizontal laser light line, for example one or more horizontal laser light line, or only produce a vertical laser light line, for example one or more vertical laser light line. In such a case, a levelling height in the self-levelling height range of the laser level is provided by means of the horizontal laser light line or vertical laser light line, and when the expected levelling height exceeds the self-levelling height range, the judgement as to whether the additional laser light line projected on the target surface by the additional laser light source is horizontal is performed on the basis of an angle between the additional laser light line and the vertical laser light line or performed on the basis of whether perpendicular distances from any two points on the additional laser light line to the horizontal laser light line are equal.

This method further comprises moving the laser level towards and away from the target surface, so as to obtain the expected levelling height. Optionally, the step of rotating the rotatable pedestal can be performed before or after the step of moving the laser level, or the two steps may be performed alternately, so as to obtain a suitable levelling height.

With the laser level of the present application that is described in detail above, the self-levelling height range that a conventional laser level is capable of obtaining can be realized by setting the reference laser light source, and an additional levelling height range higher than levelling heights in the self-levelling height range can be provided by setting the additional laser light source and the adjustment means for the additional laser light source and by suitably setting the distance between the laser level and the target surface. The provision of the additional levelling height range outside the self-levelling height range expands the application scope and practicality of the laser level. A remote control method such as a specific application program of a smart phone is used to control the adjustment means of the laser level such that any levelling height in the additional levelling height range can be achieved simply, conveniently and economically.

In an optional embodiment, the distance between the target surface and the laser level is not changed; adjustment of the levelling height can also be achieved by adjusting the angle A. Correspondingly, the laser level may also comprise an automatic or manual angle adjustment means for adjusting the angle A, and a fixing structure for fixing the additional laser light source such that the laser light beam plane projected from the additional laser light source is fixed at the adjusted angle. If the range of adjustment of the angle A is large enough, the reference laser light source need not be provided; those skilled in the art can set the horizontal and/or vertical reference line in any familiar way, and all expected levelling heights can be achieved simply by adjusting the angle A of the additional laser light source. As an example, in the case where no reference laser light source is provided, an existing horizontal or vertical reference line can be used as a standard, or a suitable sensor can be arranged in association with the pendulum bob to provide a standard for judging whether a laser light line projected onto a target flat surface from the additional laser light source is horizontal.

Although the present application has been described here with reference to particular embodiments, the scope of the present application is not limited to the details described herein. Various amendments and substitutions can be made to these details without deviating from the basic principles of the present application.

The invention claimed is:

1. A laser level, comprising:
a level body, the level body comprising a body housing and a laser light source contained in the body housing, the laser light source configured to emit a laser light beam plane so as to project a laser light line on a target surface, the laser light beam plane configured to form a non-zero angle relative to a horizontal plane when the laser light line is parallel to the horizontal axis, the non-zero angle adjustable without movement of the housing;
a fixing structure configured to fix the laser light source such that the laser light beam plane projected therefrom is fixed at an adjusted non-zero angle, the laser light line fixed at the adjusted non-zero angle providing a levelling height when in a horizontal state; and
an adjustment means configured to adjust an attitude of the laser light source, when the laser light line is projected onto the target surface from the laser light source, from a non-horizontal state to the horizontal state.

2. The laser level as claimed in claim 1, further comprising a means for providing a reference standard for judging whether the laser light source is in a horizontal state, wherein:
the means for providing a reference standard is an additional laser light source;
the additional laser light source configured to emit a reference laser light beam plane so as to project a reference laser light line on the target surface;
the reference laser light beam plane is a horizontal laser light beam plane;
the reference laser light line is a horizontal laser light line at least partially directly beneath the laser light line; and
a non-horizontal state and horizontal state of the additional laser light line is determined with reference to the horizontal laser light line.

3. A laser level, comprising:
a level body, the level body comprising a body housing and further comprising a reference laser light source and an additional laser light source which are contained in the body housing, wherein the reference laser light source is configured to emit a reference laser light beam plane so as to project a reference laser light line on a target surface, the reference laser light beam plane being a horizontal laser light beam plane, and the reference laser light line being a horizontal laser light line, and wherein the additional laser light source is configured to emit an additional laser light beam plane and an additional laser light line on the target surface, the additional laser light line providing a levelling height when in a horizontal state and spaced apart from the reference laser light line; and
an adjustment means configured to adjust an attitude of the additional laser light source, when the additional laser light line projected onto the target surface from the additional laser light source, from a non-horizontal state to a horizontal state.

4. The laser level as claimed in claim 3, wherein:
the adjustment means is a rotatable pedestal of the laser level;
when rotated, the rotatable pedestal changes the attitude of the additional laser light source; and
the rotatable pedestal and the additional laser light source rotate together in a horizontal plane.

5. The laser level as claimed in claim 4, wherein:
the rotation of the rotatable pedestal is performed in specific angular increments so as to precisely adjust the attitude of the additional laser light source progressively; and
the angular increment is less than 0.1 milliradians.

6. The laser level as claimed in claim 5, wherein:
the rotation of the rotatable pedestal is at least one of controlled manually, performed electrically by wired remote control, and performed electrically by wireless remote control; and
the additional laser light line is at least partially directly above the reference laser light line.

7. The laser level as claimed in claim 5, further comprising a control unit configured to control the rotation of the rotatable pedestal, the control unit configured to:
judge whether the additional laser light line is in a horizontal state;
when the additional laser light line is in a non-horizontal state, determine a direction and amount of rotation of the rotatable pedestal required to change the additional laser light line to the horizontal state; and
actuate the rotatable pedestal to rotate.

8. The laser level as claimed in claim 7, wherein the control unit is further configured to:
obtain perpendicular distances from two positions on the additional laser light line to the horizontal laser light line, judge that the additional laser light line is in a non-horizontal state when the two distances are not equal, and judge that the additional laser light line is in a horizontal state when the distances are equal.

9. The laser level as claimed in claim 8, wherein the control unit is further configured to:
monitor the state of the additional laser light line in real time when the rotatable pedestal rotates and the attitude of the additional laser light source consequently changes; and
stop the rotation of the rotatable pedestal when the additional laser light line changes to a horizontal state.

10. The laser level as claimed in claim 7, wherein the control unit is a specific application program of one of a smart phone and a remote controller.

11. The laser level as claimed in claim 10, wherein the laser level further comprises;
a signal receiving module configured to receive an external control signal;

a signal processing module configured to process the external control signal to form an internal control signal; and a signal execution module configured to apply the internal control signal to the rotatable pedestal so that the rotatable pedestal rotates in a horizontal plane.

12. The laser level as claimed in claim 10, wherein the control unit is configured to use a camera of a smart phone to obtain an image of the target surface that includes the additional laser light line and the reference laser light line.

13. The laser level as claimed in claim 7, wherein the control unit controls the rotatable pedestal using one of Bluetooth, WIFI, and a SIM card communication.

14. The laser level as claimed in claim 4, wherein:

the laser level further comprises a base assembly configured to support the level body, the base assembly comprising the rotatable pedestal; and the base assembly further comprises a base and supporting legs, at least one of the supporting legs being height-adjustable, so that the laser level is configured to realize a self-levelling height range using the reference laser light line projected from the reference laser light source.

15. The laser level as claimed in claim 3, wherein by changing the distance between the laser level and the target surface, the laser level is configured to realize an additional levelling height range using the additional laser light line of the additional laser light source, a levelling height in the additional levelling height range being higher than a levelling height in the self-levelling height range.

16. The laser level as claimed in claim 3, wherein the reference laser light source provides a self-levelling height using the reference laser light line, a levelling height provided by the additional laser light source being higher than the self-levelling height.

17. A method for using a laser level comprising:

providing the laser level, the laser level including a level body, the level body comprising a body housing and further comprising a reference laser light source and an additional laser light source which are contained in the body housing, wherein the reference laser light source is configured to emit a reference laser light beam plane so as to project a reference laser light line on a target surface, the reference laser light beam plane being a horizontal laser light beam plane, and the reference laser light line being a horizontal laser light line, and wherein the additional laser light source is configured to emit an additional laser light beam plane and an additional laser light line on the target surface, the additional laser light line providing a levelling height when in a horizontal state and spaced apart from the reference laser light line, and an adjustment means configured to adjust an attitude of the additional laser light source, when the additional laser light line projected onto the target surface from the additional laser light source, from a non-horizontal state to a horizontal state;

activating the reference laser light source and the additional laser light source of the laser level; and using the adjustment means of the laser level to adjust the attitude of the additional laser light source so that the additional laser light line projected onto the target surface from the additional laser light source is put into a horizontal state.

18. The method as claimed in claim 17, further comprising:

moving the laser level so as to change the distance between the laser level and the target surface.

19. The method as claimed in claim 18, wherein adjusting the attitude of the additional laser light source is performed at least one of before and after the step of moving the laser level.

20. The method as claimed in claim 17, further comprising:

monitoring the state of the additional laser light line in real time during adjustment of the attitude of the additional laser light source; and stopping the adjustment when the additional laser light line changes to a horizontal state.

* * * * *